(12) United States Patent
Lyu et al.

(10) Patent No.: US 12,002,160 B2
(45) Date of Patent: Jun. 4, 2024

(54) AVATAR GENERATION METHOD, APPARATUS AND DEVICE, AND MEDIUM

(71) Applicant: Beijing Zitiao Network Technology Co., Ltd., Beijing (CN)

(72) Inventors: Weiwei Lyu, Beijing (CN); Qiwei Huang, Beijing (CN); Xu Bai, Beijing (CN); Lang Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/069,024

(22) Filed: Dec. 20, 2022

(65) Prior Publication Data

US 2023/0128505 A1 Apr. 27, 2023

Related U.S. Application Data

(63) Continuation of application No. PCT/CN2022/086518, filed on Apr. 13, 2022.

(30) Foreign Application Priority Data

Apr. 20, 2021 (CN) .......................... 202110433895.8

(51) Int. Cl.
*G06T 17/20* (2006.01)
*G06N 20/00* (2019.01)
(Continued)

(52) U.S. Cl.
CPC ........... *G06T 17/205* (2013.01); *G06N 20/00* (2019.01); *G06T 15/506* (2013.01); *G06T 19/20* (2013.01);
(Continued)

(58) Field of Classification Search
None
See application file for complete search history.

(56) References Cited

U.S. PATENT DOCUMENTS

2008/0309675 A1 12/2008 Fleury et al.
2018/0063484 A1 3/2018 Smits
(Continued)

FOREIGN PATENT DOCUMENTS

CN 107924579 A 4/2018
CN 108765550 A 11/2018
(Continued)

OTHER PUBLICATIONS

Tianyang Shi, Yi Yuan, Changjie Fan, Zhengxia Zou, Zhenwei Shi, Yong Liu, "Face-to-Parameter Translation for Game Character Auto-Creation", Nov. 2, 2019, IEEE, 2019 IEEE/CVF International Conference on Computer Vision (ICCV), pp. 161-170.*
(Continued)

*Primary Examiner* — Robert Bader
(74) *Attorney, Agent, or Firm* — Astute IP Law Group

(57) ABSTRACT

An avatar method, apparatus and device, and a medium are provided. The method includes: acquiring a target image in response to a user input; and obtaining an avatar corresponding to the target image by using a first generator; the first generator being trained and obtained on the basis of a first sample image set and a second sample image set generated by a three-dimensional model. In the present disclosure, by using the first generator, the generation method for an avatar is effectively simplified, thus improving generation efficiency, and avatars in one-to-one correspondence to target image can be generated, so that the avatars are more diversified. Additionally, the first generator is easy to deploy in various production environments, thus reducing the performance requirements on hardware devices.

18 Claims, 4 Drawing Sheets

(51) Int. Cl.
    *G06T 15/50*     (2011.01)
    *G06T 19/20*     (2011.01)

(52) U.S. Cl.
    CPC ...... *G06T 2200/24* (2013.01); *G06T 2210/12* (2013.01); *G06T 2219/2021* (2013.01)

(56) References Cited

U.S. PATENT DOCUMENTS

| | | | |
|---|---|---|---|
| 2019/0035149 | A1 | 1/2019 | Chen et al. |
| 2019/0228587 | A1* | 7/2019 | Mordvintsev ........... G06T 19/20 |
| 2019/0236814 | A1* | 8/2019 | Shlens .................... G06T 11/00 |
| 2019/0371082 | A1 | 12/2019 | Guo et al. |
| 2020/0202111 | A1* | 6/2020 | Yuan ..................... G06V 20/20 |
| 2021/0407216 | A1 | 12/2021 | Peng et al. |
| 2022/0076470 | A1 | 3/2022 | Yang |

FOREIGN PATENT DOCUMENTS

| | | |
|---|---|---|
| CN | 109284729 A | 1/2019 |
| CN | 110033505 A | 7/2019 |
| CN | 110189397 A | 8/2019 |
| CN | 110348330 A | 10/2019 |
| CN | 110390705 A | 10/2019 |
| CN | 110782515 A | 2/2020 |
| CN | 110796721 A | 2/2020 |
| CN | 111265879 A | 6/2020 |
| CN | 111354079 A | 6/2020 |
| CN | 111598979 A | 8/2020 |
| CN | 112102468 A | 12/2020 |
| CN | 112215927 A | 1/2021 |
| CN | 112258592 A | 1/2021 |
| CN | 112541963 A | 3/2021 |
| CN | 112562045 A | 3/2021 |
| CN | 113112580 A | 7/2021 |
| WO | 2019034142 A1 | 2/2019 |

OTHER PUBLICATIONS

Fabien Danieau, Ilja Gubins, Nicolas Olivier, Olivier Dumas, Bernard Denis, Thomas Lopez, Nicolas Mollet, Brian Frager, Quentin Avril, "Automatic Generation and Stylization of 3D Facial Rigs", Mar. 27, 2019, IEEE, 2019 IEEE Conference on Virtual Reality and 3D User Interfaces (VR), pp. 784-792.*
Tianyang Shi, Zhengxia Zou, Xinhui Song, Zheng Song, Changjian Gu, Changjie Fan, Yi Yuan, "Neutral Face Game Character Auto-Creation via PokerFace-GAN", Oct. 16, 2020, ACM, MM '20: Proceedings of the 28th ACM International Conference on Multimedia, pp. 3201-3209.*
Alex J. Champandard, "Semantic Style Transfer and Turning Two-Bit Doodles into Fine Artwork", Mar. 5, 2016, arXiv.*
Ayush Tewari, Mohamed Elgharib, Gaurav Bharaj, Florian Bernard, Hans-Peter Seidel, Patrick Perez, Michael Zollhofer, Christian Theobalt, "StyleRig: Rigging StyleGAN for 3D Control over Portrait Images", Jun. 19, 2020, IEEE, 2020 IEEE/CVF Conference on Computer Vision and Pattern Recognition (CVPR), pp. 6141-6150.*
International Search Report dated Jun. 8, 2022 for related International Patent Application PCT/CN2022/086518.
Extended European Search Report in European Patent Application No. 22790918.1, mailed Apr. 24, 2024.
Sun et al., "LandmarkGAN: Synthesizing faces from landmarks", Pattern Recognition Letters., vol. 161, Feb. 6, 2021, 5 pages.
Zhang et al., "Style Separation and Synthesis via Generative Adversarial Networks", arxiv.org, Cornell University Library, Nov. 7, 2018, 9 pages.
Gecer et al., "Semi-supervised Adversarial Learning to Generate Photorealistic Face Images of New Identities from 3D Morphable Model", Oct. 6, 2018, 19 pages.

* cited by examiner

Mesh deformation of an eye part

Mesh deformation of a mouth part

AVATAR GENERATION METHOD, APPARATUS AND DEVICE, AND MEDIUM

The present application is a continuation of International Application No. PCT/CN2022/086518, filed on Apr. 13, 2022 which claims priority of Chinese Patent Application No. 202110433895.8, titled "AVATAR GENERATION METHOD, APPARATUS AND DEVICE, AND MEDIUM", filed with the China National Intellectual Property Administration on Apr. 20, 2021, both of which are incorporated herein by reference in their entireties.

FIELD

The present disclosure relates to the field of artificial intelligence technology, in particular to a method and apparatus for generating an avatar, a device and a medium.

BACKGROUND

A three-dimensional avatar with cartoon, animation or other styles is widely applied to many scenes such as a virtual anchor, e-commerce and news media, which attracts more and more users' attention and affection. At present, the three-dimensional avatar is generally rendered by Computer Graphics (CG). However, the avatar generated by CG is single and lack of personalization. If a variety of avatars want to be achieved, it is required to modify from modeling, which takes a long time to produce and has high manpower costs. Moreover, rendering process requires an extremely high graphics hardware device (such as a video card). In terms of rendering visual effects such as character fidelity and light and shadow complexity, it is difficult to generate a satisfactory avatar using a hardware device with limited performance (such as a cellphone).

SUMMARY

In order to solve or at least partially solve the above technical problems, a method and apparatus for generating an avatar, a device and a medium are provided according to the present disclosure.

A method for generating an avatar is provided according to an embodiment of the present disclosure. The method includes:
 acquiring a target image in response to a user input; and
 obtaining an avatar corresponding to the target image by a first generator;
 where the first generator is obtained by training based on a first sample image set and a second sample image set generated by a three dimensional model.

In an embodiment, before the obtaining an avatar corresponding to the target image by a first generator, the method further includes:
 detecting key points of a face in the target image, and determining a bounding box containing the key points.

The obtaining an avatar corresponding to the target image by the first generator includes:
 inputting the key points at the bounding box and a preset position to the first generator;
 generating a first image by the first generator, wherein the first image includes a target style feature and a content feature of the target image, and the target style feature is a style feature learned by the first generator from images of the second sample image set; and
 determining the avatar corresponding to the target image based on the first image.

In an embodiment, the determining the avatar corresponding to the target image based on the first image further includes:
 extracting illumination information and low-frequency information in the target image;
 fusing the illumination information and the low-frequency information with information in the same level as the illumination information and the low-frequency information of the first image, to obtain a second image; and
 determining the second image as the avatar corresponding to the target image.

In an embodiment, second sample images in the second sample image set are obtained by:
 establishing a plurality of target three dimensional models with different faces; and
 rendering the plurality of target three dimensional models to obtain a plurality of second sample images.

In an embodiment, the establishing a plurality of target three dimensional models with different faces includes:
 establishing an initial three dimensional model of a face; and
 performing mesh deformation on different parts of the initial three dimensional model to obtain the plurality of target three dimensional models with different faces.

In an embodiment, the second sample image set further includes a sample image containing a three dimensional model of a face, and the first sample image set includes a sample image containing a real face, and the method further includes:
 generating, by a second generator, the sample image containing the three dimensional model of the face and the sample image containing the real face.

In an embodiment, the generating the sample image containing the three dimensional model of the face and the sample image containing the real face by a second generator includes:
 inputting a first sample image in the first sample image set and a second sample image in the second sample image set, to the second generator; and
 generating the sample image containing the three dimensional model of the face and the sample image containing the real face by the second generator alternately using forward mixing and reverse mixing, wherein the forward mixing is to generate the sample image containing the three dimensional model of the face based on the first sample image, and the reverse mixing is to generate the sample image containing the real face based on the second sample image.

In an embodiment, a process of training the first generator includes:
 acquiring a first sample image from the first sample image set, and acquiring a second sample image from the second sample image set;
 generating an avatar sample image corresponding to the first sample image, based on the second sample image by the first generator to be trained;
 calculating an image loss value between the first sample image and the avatar sample image, wherein the image loss value is used to evaluate a correlation between the first sample image and the avatar sample image;
 calculating a content loss value between the first sample image and the avatar sample image;
 calculating a style loss value between the second sample image and the avatar sample image;
 determining a target loss value based on the image loss value, the content loss value, and the style loss value; and
 training the first generator based on the target loss value.

In an embodiment, the determining a target loss value based on the image loss value, the content loss value and the style loss value includes:

determining weight coefficients of the image loss value, the content loss value and the style loss value, wherein the weight coefficients are used to adjust a similarity between the avatar sample image and the first sample image; and determining a weighted sum of the image loss value, the content loss value and the style loss value based on the weight coefficients, as the target loss value.

In an embodiment, the acquiring a target image in response to a user input includes:

detecting an image acquisition instruction input by a user, wherein the image acquisition instruction includes: a selection operation, a shooting operation, an upload operation, a gesture input or an action input; and acquiring the target image in response to the image acquisition instruction.

In an embodiment, an image in the first sample image set includes a real face, and an image in the second sample image set is generated by a three dimensional model containing a face.

An apparatus for generating an avatar is provided according to an embodiment of the present disclosure. The apparatus includes an image acquisition model and an avatar generation model.

The image acquisition model is configured to acquire a target image in response to a user input.

The avatar generation model is configured to obtain an avatar corresponding to the target image by a first generator.

The first generator is obtained by training based on a first sample image set and a second sample image set generated by a three dimensional model.

An electronic device is provided according to an embodiment of the disclosure. The electronic device includes a processor and a memory configured to store instructions executable by the processor. The processor is configured to read the executable instructions from the memory and execute the instructions to implement the method for generating the avatar according to an embodiment of the present disclosure.

A computer readable storage medium is further provided according to an embodiment of the disclosure. The storage medium stores a computer program, and the computer program is configured to perform the method for generating the avatar according to an embodiment of the present disclosure.

Compared with the conventional technology, the technical solution according to embodiments of the present disclosure has the following advantages.

A method and apparatus for generating an avatar, a device and a medium are provided according to an embodiment of the present disclosure. In the technical solution, a target image is acquired in response to a user input, and an avatar corresponding to the target image is obtained by a first generator. Compared with the existing CG method, in the technical solution, the use of the first generator effectively simplifies the method for generating the avatar, improves the generation efficiency. The avatar corresponding to the target image can be generated in a one-to-one manner, making the avatar more diversified. In addition, the first generator is easy to deploy in various production environments, reducing the performance requirements for a hardware device.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings can be obtained according to the provided drawings without any creative effort.

DETAILED DESCRIPTION

In order to make the purposes, features, and advantage of the present disclosure more apparent and easy to understand, the technical solutions in the embodiments of the present disclosure will be described clearly and completely hereinafter. It should be noted that the embodiments of the present disclosure and the features in the embodiments can be combined with each other if there is no conflict.

In the following detailed description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

An avatar generated based on CG in conventional technology has a problem of a single character. It takes a lot of time and manpower to achieve the diversification of avatars. The rendering process requires extremely high graphics hardware device. Based on this, a method and apparatus for generating an avatar, a device and a medium are provided according to the embodiments of the present disclosure, which may be used in games, live broadcasts and other scenes that need to generate the avatar. To facilitate understanding, the embodiment of the present disclosure is described in detail below.

Figure 1:
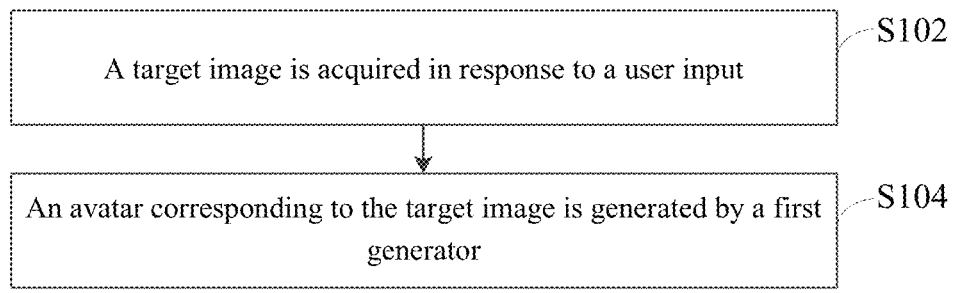
FIG. 1 is a schematic flowchart of a method for generating an avatar according to an embodiment of the present disclosure.

FIG. 1 is a schematic flowchart of a method for generating an avatar according to the embodiment of the present disclosure. The method may be executed by an apparatus for generating an avatar, and the apparatus may be implemented in software and/or hardware and generally may be integrated into an electronic device. As shown in FIG. 1, the method includes step S102 and step S104.

In step S102, a target image is acquired in response to a user input.

The target image includes a face of at least one target object. The target object may be, for example, a real object with a specific face image such as a person, an animal, etc. To facilitate understanding, as an example, in an embodiment of the present disclosure, a person is described as a target object. Accordingly, the face is a human face.

In some embodiments, an image acquisition instruction input by a user may be detected first. The image acquisition instruction may include, but is not limited to: a selection operation, a shooting operation, an upload operation, a gesture input or an action input. The gesture input includes patterns formed by clicking, long pressing, short pressing, dragging and touching a screen, etc. The action input includes hand actions such as stretching fingers, waving hands etc., and facial expressions such as blinking and opening mouth, etc. It may be understood that the above is only an example of the image acquisition instruction and should not be understood as a limitation.

Then, the target image is acquired in response to the image acquisition instruction. In some specific embodiments, the target image may be an image shot by an image collection apparatus in response to the shooting operation, or an image uploaded from a local storage manually in response to the upload operation. The target image may include a face of at least one target object. Considering that the target images acquired in different ways may have different sizes, an original image may be acquired first, and then a region image containing the face of the target object may be cropped from the original image based on a preset size, and the cropped region image is taken as the target image.

In step S104, an avatar corresponding to the target image is generated by a first generator.

The first generator may be, for example, Generic Adversary Networks (GAN), which is obtained by training based on a first sample image set and a second sample image set generated by a three-dimensional model. The image in the first sample image set includes a real face, and the image in the second sample image set is generated based on a three dimensional model containing a face. The specific implementation process of training the first generator will be described below. A trained first generator has a function of generating an avatar. The avatar in this embodiment is a virtual three dimensional image with animation style, oil painting style and other styles.

In the method for generating the avatar according to an embodiment of the present disclosure, a target image is acquired in response to a user input, and an avatar corresponding to the target image is generated by a first generator. Compared with the existing CG mode, in this technical scheme, the use of the first generator effectively simplifies the method for generating the avatar, reduces the generation cost, and improves the generation efficiency. The avatar corresponding to the target image can be generated in a one-to-one manner, making the avatar more diversified. In addition, the first generator is easy to deploy in various production environments, reducing the performance requirements for a hardware device.

In order to better understand the method for generating the avatar according to the present disclosure, embodiments of the present disclosure will be described below.

For the second sample image set for training the first generator, a method for acquiring a second sample image in the second sample image set is provided according to an embodiment, as shown below.

Figure 2:
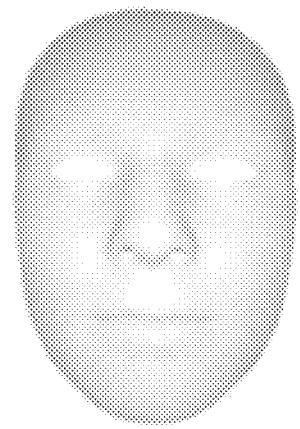
FIG. 2 is a schematic diagram of an initial three-dimensional model according to an embodiment of the present disclosure.

Multiple target three dimensional models with different faces are established. In a specific implementation, an initial three dimensional model of a face may be first established by three dimensional modeling tools such as MAYA and 3D Max, as shown in FIG. 2. Then, mesh deformation are performed on different parts of the initial three dimensional model to obtain the multiple target three dimensional models with different faces.

Figure 3:
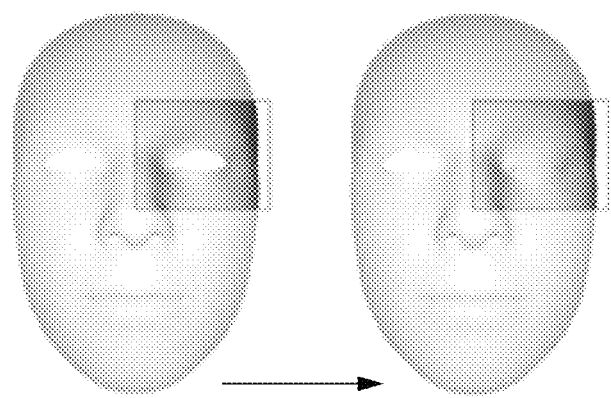
FIG. 3 is a schematic diagram of a mesh deformation according to an embodiment of the present disclosure.
Figure 3:
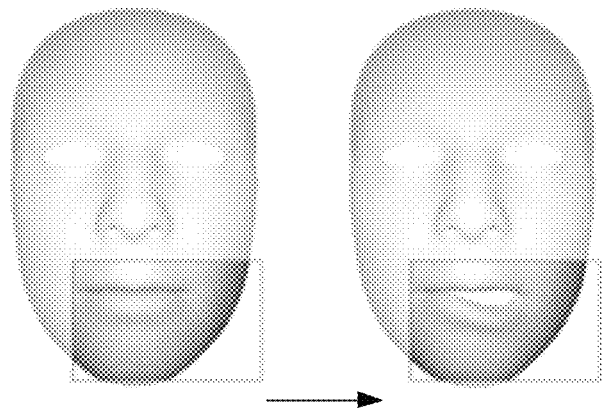

The initial three dimensional model has a grid topology. Mesh deformation refers to deformation of a local grid topology corresponding to a target part, so that the target part represented by the deformed mesh meets deformation needs of a user. In a specific example, as shown in FIG. 3, the mesh deformation is performed on a unilateral eye part of the initial three dimensional model, so that the eye changes from an open state to a closed state, and a target three dimensional model of a face with one closed eye is obtained. For another example, mesh deformation is performed on a mouth part of the initial three dimensional model, so that the mouth changes from a normal closed state to a twitched state, and a target three dimensional model of a face with a twitched mouth expression is obtained. It may be understood that FIG. 3 is only an example of two forms of mesh deformation. In addition, there may be many forms of mesh deformation, such as a deformation of the width of a face contour, which is not listed one by one here. In this embodiment, through mesh deformation, multiple target three dimensional models with diversified facial forms may be obtained from the initial three dimensional model with single facial form.

Next, the target three dimensional model may be rendered to obtain multiple second sample images. Specifically, for each of the target three dimensional models, texture information of the model, such as hair style, hair color, skin color, fat and thin face shapes, and lighting, may be rendered to obtain a second sample image containing different three dimensional facial models. Examples of the different second sample images obtained by rendering are as follows. A second sample image P1 is a face of a girl with blue shawl hair, straight eyebrows, slanted eyes, and a smile. A second sample image P2 is a face of a girl with gray shawl hair, willow eyebrows, round eyes, and a slightly open mouth. A second sample image P3 is a face of a girl with brown ponytail, eyebrows covered by a fringe, eyes upwards, and mouth pouting. A second sample image P4 is a face of a bearded boy with short hair.

The images in the second sample image set generated based on the three dimensional model may include limited images of a three dimensional model. Based on this, the following method for acquiring an image in the second sample image set may be provided according to an embodiment. The method may include: generating a sample image containing a three dimensional model of a face by a second generator, and adding the generated sample image containing the three dimensional model of the face to the second sample image set. The second generator in the embodiment is configured to generate the sample image containing the three dimensional model of the face, based on an image with a real face. The image with the real face may be chosen from first sample images in the first sample image set. Examples of sample images containing the three dimensional model of the face generated by the second generator include: a sample image with closed eyes expressions and a sample image wearing glasses on the face. A wide variety of second sample images may be generated by the second generator, which increases the diversity of images in the second sample image set. In this embodiment, both the second sample image generated based on the three dimensional model and the second sample image generated by the second generator are jointly used as training data for the three dimensional model of the face, and applied to the process of training the first generator.

For the first sample image set for training the first generator, the first sample images is usually collected from a network or a local database, or collected by an image collection apparatus. In practical applications, first sample images with special facial features such as closed eyes, wearing glasses, laughing and so on are few or difficult to collect. Therefore, referring to the method for generating the second sample images by the second generator, a sample image containing a real face is generated by the second generator according to this embodiment. The generated sample image containing the real face is added to the first sample image set, thus increasing the diversity of the first sample image.

In the above embodiment, the method for generating the first sample image and the second sample image by the second generator includes: inputting the first sample images in the first sample image set and the second sample images in the second sample image set to the second generator; generating a sample image containing a three dimensional model of a face and a sample image containing a real face by the second generator alternately using forward mixing and reverse mixing. The forward mixing is to generate the sample image containing the three dimensional model of the face based on the first sample images, and the reverse mixing is to generate the sample image containing the real face based on the second sample images.

Based on the first sample image set and the second sample image set, a process of training the first generator is provided according to this embodiment, as shown in steps 1 to 7 below.

In step 1, any first sample image is acquired from the first sample image set, and any second sample image is acquired from the second sample image set.

In step 2, an avatar sample image corresponding to the first sample image is generated based on the second sample image, by a first generator to be trained.

Figure 4:
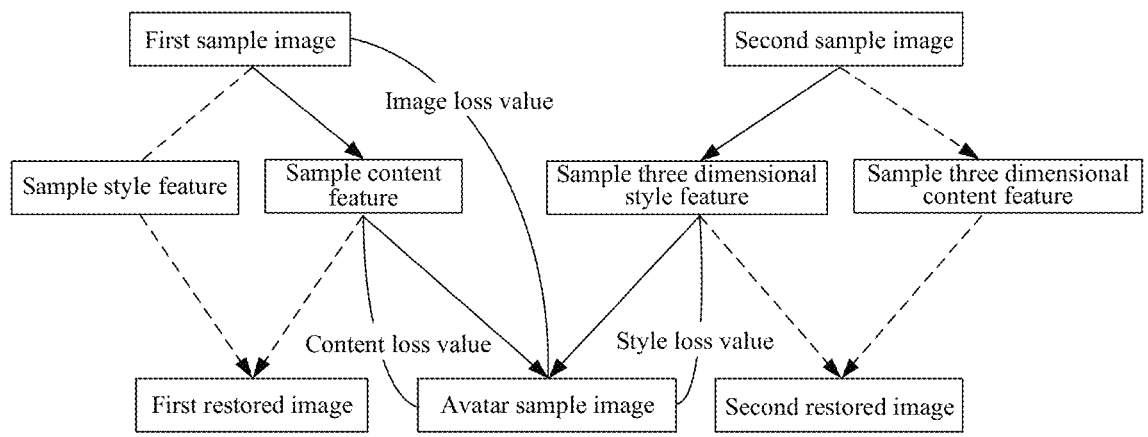
FIG. 4 is a schematic diagram of a method for generating an avatar sample image according to an embodiment of the present disclosure.

In an embodiment, the first generator to be trained is a generator in the GAN network, and the GAN network further includes a discriminator. As shown in FIG. 4, a sample content feature of the first sample image and a sample three dimensional style feature of the second sample image are extracted by the first generator. The sample content feature is used to represent position information of the face in the first sample image, such as position coordinates of key points such as mouth, eye and nose, facial angle and hairstyle contour. The sample three dimensional style feature is used to represent a high-level semantic feature such as tone, shape, texture, etc. of the face in the second sample image. Then, the sample content feature and the sample three dimensional style feature are fused to obtain the avatar sample image. The avatar sample image includes an avatar corresponding to the real face in the first sample image.

In addition, it should be noted that in practical applications, a sample style feature of the first sample image and a sample three dimensional content feature of the second sample image may be extracted by the first generator. A first restored image corresponding to the first sample image is generated based on the sample style feature and the sample content feature, and a second restored image corresponding to the second sample image is generated based on the sample three dimensional style feature and the sample three dimensional content feature.

In order to ensure a correlation between an output image and an input image of the first generator, that is, to ensure that the avatar is more similar to the real face, a target loss value representing the correlation between the avatar sample image and the first sample image may be added in the training process of the first generator. A process of calculating the target loss value is shown in steps 3 to 6 below.

In step 3, an image loss value between the first sample image and the avatar sample image is calculated. The image loss value is used to evaluate the correlation between the first sample image and the avatar sample image.

In step 4, a content loss value between the first sample image and the avatar sample image is calculated.

In step 5, a style loss value between the second sample image and the avatar sample image is calculated.

In step 6, a target loss value is determined based on the image loss value, the content loss value and the style loss value. Specifically, weight coefficients of the image loss value, the content loss value and the style loss value are determined. The weight coefficients are used to adjust a similarity between the avatar sample image and the first sample image, which may be set according to the actual requirements. For example, when a user requires that the generated avatar is more similar to the real face, the weight coefficient of the content loss value may be set to be greater than that of the style loss value. When a user requires that the generated avatar has more virtual styles such as animation, the weight coefficient of the style loss value may be set to be greater than that of the content loss value. A weighted sum of the image loss value, the content loss value and the style loss value is determined based on the weight coefficient, as the target loss value.

The correlation and content loss between the first sample image and the avatar sample image, as well as style loss between the second sample image and the avatar sample image are comprehensively considered for the target loss value in this embodiment. The first generator is trained through the target loss value, so that the first generator can better acquire the avatar with high fitness to a target object, and the user experience is improved.

In step 7, the first generator is trained based on the target loss value. In this embodiment, parameters of the first generator may be adjusted based on the target loss value and the training continues. When the target loss value converges to a preset value, the training is ended, and the trained first generator is obtained.

A first generator that may be directly applied to generation of the avatar is obtained through the above training process. After being compressed, the first generator is migrated to a cellphone, a tablet and other hardware devices for use.

Figure 5:
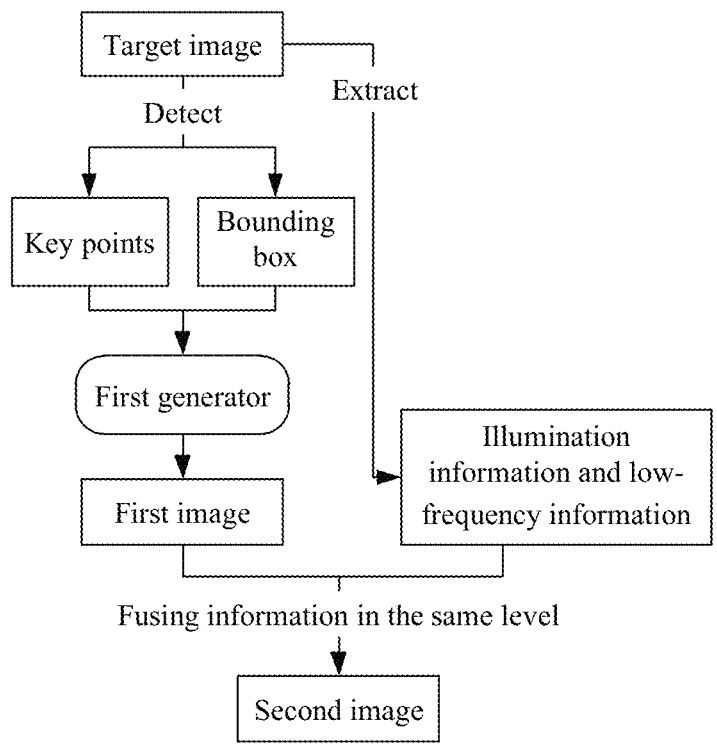
FIG. 5 is a schematic diagram of a process of generating an avatar according to an embodiment of the present disclosure.

As shown in FIG. 5, before the avatar corresponding to the target object is generated by the first generator, key points of the face in the target image may be first detected in this embodiment, and a bounding box containing the key points is determined. Specifically, the key points of the face in the target image may be detected in a face detection algorithm, and the bounding box containing the key points is determined.

Then, the process of generating the avatar corresponding to the target image by the first generator may include: inputting the key points at the bounding box and a preset position to the first generator, and generating a first image by the first generator. The preset position is a group of positions representing face content, such as a left eye position, an eyebrow head position and an eyebrow tail position of the right eyebrow, and a left position under the nose. The preset position may also be other positions that can represent face content. The first image generated by the first generator includes the target style feature, and the content feature of the target image. The target style feature is learned by the first generator from images of the second sample image set, such as an animation style feature.

The avatar corresponding to the target image is determined based on a first image. In an implementation, the first image may be directly determined as the avatar corresponding to the target image.

In order to make the avatar more realistic and more compatible with the object and environment in the target image, another implementation may be provided. (1) Illumination information and low-frequency information in the target image are extracted. In a practical application, a frequency of an image is an indicator representing an intensity of a gray level change in the image. A region with slow gray level change in the image corresponds to the low-frequency information. Based on this, an approximate contour of the face in the target image may be represented by the low-frequency information. (2) The illumination information and the low-frequency information are fused with information in the same level as the illumination information and the low-frequency information of the first image, to obtain the second image. (3) The second image is determined as the avatar corresponding to the target image.

In conclusion, in the method for generating the avatar according to the embodiments of the present disclosure, the use of the first generator effectively simplifies the method for generating the avatar and improves the generation efficiency. In the process of training the first generator, the diversity of training data is effectively increased through the first sample image set and the second sample image set generated by the second generator based on the three dimensional model. In actual use, if a variety of avatars want to be obtained by the trained first generator, it is only necessary to change the target image input to the first generator. Then, the avatar corresponding to the target image can be generated in a one-to-one manner, making the avatar more diversified. Thus, the personalized and diversified requirements of users for avatars are met. In addition, the first generator is easy to deploy in various production environments, reducing the performance requirements for hardware devices.

Figure 6:
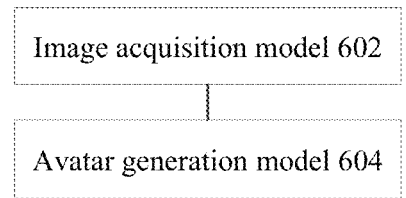
FIG. 6 is the structural block diagram of an apparatus for generating an avatar according to an embodiment of the present disclosure.

FIG. 6 is a schematic structural diagram of an apparatus for generating an avatar according to an embodiment of the present disclosure. The apparatus may be implemented by software and/or hardware, may be generally integrated in electronic devices, and may generate an avatar of a target object by executing the method for generating the avatar. As shown in FIG. 6, the apparatus includes an image acquisition model 602 and an avatar generation model 604.

The image acquisition model 602 is configured to acquire a target image in response to a user input.

The avatar generation model 604 is configured to obtain an avatar corresponding to the target image by a first generator.

The first generator is obtained by training based on a first sample image set and a second sample image set generated by a three dimensional model.

In an embodiment, the apparatus further includes: a detection module configured to detect key points of a face in the target image, and determine a bounding box containing the key points.

Accordingly, the avatar generation model 604 includes an input unit, an image generation unit and an avatar generation unit.

The input unit is configured to input the key points at the bounding box and a preset position to the first generator.

The image generation unit is configured to obtain a first image by the first generator, where the first image includes a target style feature and a content feature of the target image, the target style feature is learned by the first generator from images of the second sample image set.

The avatar generation unit is configured to determine the avatar corresponding to the target image based on the first image.

In an embodiment, the avatar generation unit is further configured to extract illumination information and low-frequency information from the target image; fuse the illumination information and the low frequency information with information in the same level as the illumination information and the low-frequency information of the first image, to obtain a second image; and determine the second image as the avatar corresponding to the target image.

In an embodiment, the apparatus includes a second sample image acquisition module. The second sample image acquisition module includes a modeling unit and a rendering unit.

The modeling unit is configured to establish multiple target three dimensional models with different faces.

The rendering unit is configured to render the target three dimensional models to obtain multiple second sample images.

In an embodiment, the modeling unit is configured to: establish an initial three dimensional model of a face; perform mesh deformation on different parts of the initial dimensional model to obtain multiple three dimensional models with different faces.

In an embodiment, the apparatus further includes: a sample image generation module configured to:

generate a sample image containing a three dimensional model of a face and a sample image containing a real face by a second generator; and add the sample image containing the three dimensional model of the face to a second sample image set, and add the sample image containing the real face to a first sample image set.

In an embodiment, the sample image generation module is configured to:

input a first sample image in the first sample image set and a second sample image in the second sample image set, to the second generator; and generate the sample image containing the three dimensional model of the face and the sample image containing the real face by the second generator alternately using forward mixing and reverse mixing, where the forward mixing is to generate the sample image containing the three dimensional model of the face based on the first sample image, and the reverse mixing is to generate the sample image containing the real face based on the second sample image.

In an embodiment, the apparatus further includes a training module configured to:

acquire a first sample image from the first sample image set, and acquire a second sample image from the second sample image set;

generate an avatar sample image corresponding to the first sample image, based on the second sample image by the first generator to be trained;

calculate an image loss value between the first sample image and the avatar sample image, where the image loss value is used to evaluate a correlation between the first sample image and the avatar sample image;

calculate a content loss value between the first sample image and the avatar sample image;

calculate a style loss value between the second sample image and the avatar sample image;

determine a target loss value based on the image loss value, the content loss value and a style loss value; and train the first generator based on the target loss value.

In an embodiment, the training module is configured to:

determine weight coefficients of the image loss value, the content loss value and the style loss value, where the weight coefficients are used to adjust a similarity between the avatar sample image and the first sample image; and determine a weighted sum of the image loss value, the content loss value and the style loss value based on the weight coefficients, as the target loss value.

In an embodiment, the image acquisition model 602 includes an instruction detection unit and an image acquisition unit.

The instruction detection unit is configured to detect an image acquisition instruction input by a user, where the image acquisition instruction includes: a selection operation, a shooting operation, an upload operation, a gesture input or an action input.

The image acquisition unit is configured to acquire a target image in response to the image acquisition instruction.

The apparatus for generating the avatar according to an embodiment of the present disclosure may perform the method for generating the avatar according to any embodiment of the present disclosure, which has corresponding functional modules and beneficial effects of performing the method.

Figure 7:
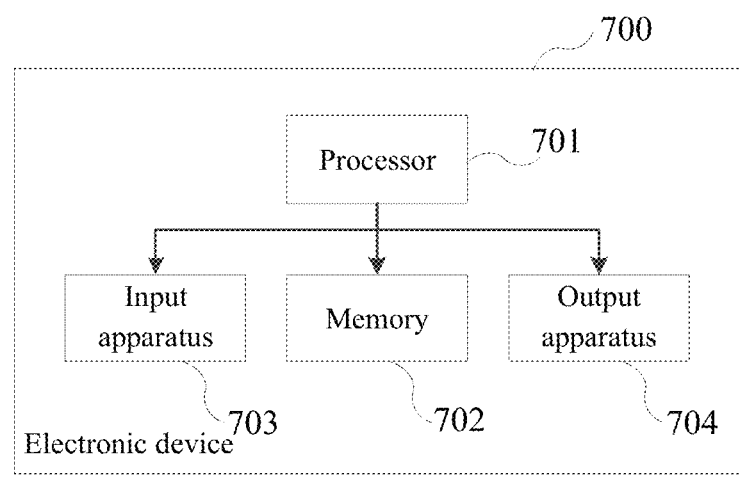
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device 700 includes a processor 701, and a memory 702 configured to store executable instructions for the processor 701. The processor 701 is configured to read the executable instructions from the memory 702 and execute the instructions to implement the method for generating the avatar in the above embodiment.

The processor 701 may be a central processing unit (CPU) or other form of processing unit with data processing capability and/or instruction execution capability, which may control other components in the electronic device 700 to perform desired functions.

The memory 702 may include one or more computer program products. The computer program products may include various forms of computer readable storage media, such as volatile memory and/or non-volatile memory. The volatile memory may include, for example, random access memory (RAM) and/or cache memory. The non-volatile memory may include, for example, a read-only memory (ROM), a hard disk, a flash memory, and the like. One or more computer program instructions may be stored on the computer readable storage medium, and the processor 701 may run the program instructions to implement the method for generating the avatar in an embodiment of the present disclosure described above and/or other desired functions. Various contents such as an input signal, a signal component, a noise component and the like may be stored in the computer readable storage medium.

In an example, the electronic device 700 may further include an input apparatus 703 and an output apparatus 704. The input apparatus 703 and the output apparatus 704 are interconnected by a bus system and/or other forms of connection mechanisms (not shown).

In addition, the input apparatus 703 may further include, for example, a keyboard, a mouse, and the like.

The output apparatus 704 may output various information, including determined distance information, direction information, etc. The output apparatus 704 may include, for example, a display, a speaker, a printer, a communication network, a remote output device connected thereto, and the like.

To simplify, only some of the components related to the present disclosure in the electronic device 700 are shown in FIG. 7, and components such as a bus, input/output interfaces, and the like are omitted. In addition, the electronic device 700 may further include any other suitable components, depending on the specific application.

In addition to the above method and device, an embodiment of the present disclosure may relate to a computer program product. The computer program product includes computer program instructions. The computer program instructions, when run by the processor, cause the processor to perform the method for generating the avatar according to an embodiment of the present disclosure.

The program code for performing the operations of an embodiment of the present disclosure may be written in one or more programming languages or any combination thereof by the computer program product. The programming language includes object-oriented programming languages, such as Java, C++, etc., and a conventional procedural programming languages, such as "C" language or similar programming languages. The program code may be executed entirely on a user computing device, partially on a user device, as an independent software package, partially on the user computing device and partially on a remote computing device, or entirely on the remote computing device or a server.

In addition, a computer readable storage medium storing computer program instructions thereon is provided according to an embodiment of the present disclosure. The computer program instructions, when run by a processor, cause the processor to perform the method for generating the avatar according to an embodiment of the present disclosure.

The computer readable storage medium may adopt any combination of one or more readable media. The readable medium may be a readable signal medium or a readable storage medium. The readable storage medium may include, but is not limited to, for example, a system, an apparatus, or a device in an electronic, magnetic, optical, electromagnetic, infrared, or semi-conductive form, or any combination thereof. Examples (non-exhaustive list) of the readable storage medium include: an electrical connection with one or more wires, a portable disk, a hard disk, a Random Access Memory (RAM), a Read Only Memory (ROM), an Erasable Programmable Read-Only Memory (EPROM or flash memory), an optical fiber, a portable compact disk read only memory (CD-ROM), an optical storage device, a magnetic storage device, or any suitable combination thereof.

A computer program product is provided according to an embodiment of the present disclosure. The computer program product includes a computer program/instruction. The computer program/instruction, when executed by a processor, implements the method according to an embodiment of the present disclosure.

It should be noted that the terms "first", "second" and the like in the description are used for distinguishing an entity or operation from another entity or operation, but not intended to describe an actual relationship or order between these entities or operations. In addition, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, a process, method, article or device limited by "comprising/including a(n) . . . " does not exclude existence of another identical element in such process, method, article or device.

The above are only specific implementations of the present disclosure, so that those skilled in the art can understand or implement the present disclosure. It is obvious for those skilled in the art to make many modifications to these embodiments. The general principle defined herein may be applied to other embodiments without departing from spirit or scope of the present disclosure. Therefore, the present disclosure is not limited to the embodiments illustrated herein, but should be defined by the broadest scope consistent with the principle and novel features disclosed herein.

The invention claimed is:

1. A method for generating an avatar, comprising:
   acquiring a target image in response to a user input; and
   obtaining an avatar corresponding to the target image by a first generator;
   wherein the first generator is obtained by training based on a first sample image set and a second sample image set generated by a three dimensional model,
   wherein a process of training the first generator comprises:
     acquiring a first sample image from the first sample image set, and acquiring a second sample image from the second sample image set;
     generating an avatar sample image corresponding to the first sample image, based on the second sample image by the first generator to be trained;
     calculating an image loss value between the first sample image and the avatar sample image, wherein the image loss value is used to evaluate a correlation between the first sample image and the avatar sample image;
     calculating a content loss value between the first sample image and the avatar sample image;
     calculating a style loss value between the second sample image and the avatar sample image;
     determining a target loss value based on the image loss value, the content loss value, and the style loss value; and
     training the first generator based on the target loss value.

2. The method according to claim 1, wherein before the obtaining an avatar corresponding to the target image by a first generator, the method further comprises:
   detecting key points of a face in the target image, and determining a bounding box containing the key points; and
   the obtaining an avatar corresponding to the target image by a first generator comprises:
     inputting the key points at the bounding box and a preset position to the first generator;
     generating a first image by the first generator, wherein the first image comprises a target style feature and a content feature of the target image, and the target style feature is a style feature learned by the first generator from images of the second sample image set; and
     determining the avatar corresponding to the target image based on the first image.

3. The method according to claim 2, wherein the determining the avatar corresponding to the target image based on the first image further comprises:
   extracting illumination information and low-frequency information in the target image;
   fusing the illumination information and the low-frequency information with information in a same level as the illumination information and the low-frequency information of the first image, to obtain a second image; and
   determining the second image as the avatar corresponding to the target image.

4. The method according to claim 1, wherein second sample images in the second sample image set are obtained by:
   establishing a plurality of target three dimensional models with different faces; and
   rendering the plurality of target three dimensional models to obtain a plurality of second sample images.

5. The method according to claim 4, wherein the establishing a plurality of target three dimensional models with different faces comprises:
   establishing an initial three dimensional model of a face; and
   performing mesh deformation on different parts of the initial three dimensional model, to obtain the plurality of target three dimensional models with different faces.

6. The method according to claim 4, wherein the second sample image set further comprises a sample image containing a three dimensional model of a face, and the first sample image set comprises a sample image containing a real face, and the method further comprises:
   generating, by a second generator, the sample image containing the three dimensional model of the face and the sample image containing the real face.

7. The method according to claim 6, wherein the generating, by a second generator, the sample image containing the three dimensional model of the face and the sample image containing the real face comprises:
   inputting a first sample image in the first sample image set and a second sample image in the second sample image set, to the second generator; and
   generating the sample image containing the three dimensional model of the face and the sample image containing the real face by the second generator alternately using forward mixing and reverse mixing, wherein the forward mixing is to generate the sample image containing the three dimensional model of the face based on the first sample image, and the reverse mixing is to generate the sample image containing the real face based on the second sample image.

8. The method according to claim 1, wherein the determining a target loss value based on the image loss value, the content loss value and the style loss value comprising:
   determining weight coefficients of the image loss value, the content loss value and the style loss value, wherein the weight coefficients are used to adjust a similarity between the avatar sample image and the first sample image; and
   determining a weighted sum of the image loss value, the content loss value and the style loss value based on the weight coefficient, as the target loss value.

9. The method according to claim 1, wherein the acquiring a target image in response to a user input comprises:
   detecting an image acquisition instruction input by a user, wherein the image acquisition instruction comprises: a selection operation, a shooting operation, an upload operation, a gesture input or an action input; and
   acquiring a target image in response to the image acquisition instruction.

10. The method according to claim 1, wherein an image in the first sample image set comprises a real face, and an image in the second sample image set is generated by a three dimensional model containing a face.

11. An electronic device, comprising:
a processor;
a memory configured to store instructions executable by the processor;
wherein the processor is configured to read the executable instructions from the memory;
and the instructions, when executed by the processor, cause the processor to:
acquire a target image in response to a user input; and
obtain an avatar corresponding to the target image by a first generator;
wherein the first generator is obtained by training based on a first sample image set and a second sample image set generated by a three dimensional model,
wherein the instructions, when executed by the processor, cause the processor to implement a process of training the first generator, wherein the process of training the first generator comprises:
acquiring a first sample image from the first sample image set, and acquiring a second sample image from the second sample image set;
generating an avatar sample image corresponding to the first sample image, based on the second sample image by the first generator to be trained;
calculating an image loss value between the first sample image and the avatar sample image, wherein the image loss value is used to evaluate a correlation between the first sample image and the avatar sample image;
calculating a content loss value between the first sample image and the avatar sample image;
calculating a style loss value between the second sample image and the avatar sample image;
determining a target loss value based on the image loss value, the content loss value, and the style loss value; and
training the first generator based on the target loss value.

12. The electronic device according to claim 11, wherein the instructions, when executed by the processor, cause the processor to:
detect key points of a face in the target image, and determine a bounding box containing the key points;
input the key points at the bounding box and a preset position to the first generator;
generate a first image by the first generator, wherein the first image comprises a target style feature and a content feature of the target image, and the target style feature is a style feature learned by the first generator from images of the second sample image set; and
determine the avatar corresponding to the target image based on the first image.

13. The electronic device according to claim 12, wherein the instructions, when executed by the processor, cause the processor to:
extract illumination information and low-frequency information in the target image;
fuse the illumination information and the low-frequency information with information in a same level as the illumination information and the low-frequency information of the first image, to obtain a second image; and
determine the second image as the avatar corresponding to the target image.

14. The electronic device according to claim 11, wherein second sample images in the second sample image set are obtained by:
establishing a plurality of target three dimensional models with different faces; and
rendering the plurality of target three dimensional models to obtain a plurality of second sample images.

15. The electronic device according to claim 14, wherein the instructions, when executed by the processor, cause the processor to:
establish an initial three dimensional model of a face; and
perform mesh deformation on different parts of the initial three dimensional model, to obtain the plurality of target three dimensional models with different faces.

16. The electronic device according to claim 14, wherein the second sample image set further comprises a sample image containing a three dimensional model of a face, and the first sample image set comprises a sample image containing a real face, and
the instructions, when executed by the processor, cause the processor to:
generate, by a second generator, the sample image containing the three dimensional model of the face and the sample image containing the real face.

17. The electronic device according to claim 16, wherein the instructions, when executed by the processor, cause the processor to:
input a first sample image in the first sample image set and a second sample image in the second sample image set, to the second generator; and
generate the sample image containing the three dimensional model of the face and the sample image containing the real face by the second generator alternately using forward mixing and reverse mixing, wherein the forward mixing is to generate the sample image containing the three dimensional model of the face based on the first sample image, and the reverse mixing is to generate the sample image containing the real face based on the second sample image.

18. A non-transitory computer readable storage medium, wherein the storage medium stores a computer program; and the computer program, when executed by a processor, causes the processor to:
acquire a target image in response to a user input; and
obtain an avatar corresponding to the target image by a first generator;
wherein the first generator is obtained by training based on a first sample image set and a second sample image set generated by a three dimensional model,
wherein the first generator is trained by:
acquiring a first sample image from the first sample image set, and acquiring a second sample image from the second sample image set;
generating an avatar sample image corresponding to the first sample image, based on the second sample image by the first generator to be trained;
calculating an image loss value between the first sample image and the avatar sample image, wherein the image loss value is used to evaluate a correlation between the first sample image and the avatar sample image;
calculating a content loss value between the first sample image and the avatar sample image;
calculating a style loss value between the second sample image and the avatar sample image;

determining a target loss value based on the image loss value, the content loss value, and the style loss value; and training the first generator based on the target loss value.

* * * * *